United States Patent
Fukui et al.

(10) Patent No.: US 8,449,352 B2
(45) Date of Patent: May 28, 2013

(54) CARBON ELECTRODE GRINDING APPARATUS

(75) Inventors: Masanori Fukui, Akita (JP); Minoru Shirakawa, Akita (JP); Tadashi Nemoto, Akita (JP); Tadashi Sato, Akita (JP)

(73) Assignee: Japan Super Quartz Corporation, Akita-Shi (JP)

( * ) Notice: Subject to any disclaimer, the term of this patent is extended or adjusted under 35 U.S.C. 154(b) by 656 days.

(21) Appl. No.: 12/687,264

(22) Filed: Jan. 14, 2010

(65) Prior Publication Data

US 2010/0178855 A1 Jul. 15, 2010

(30) Foreign Application Priority Data

Jan. 14, 2009 (JP) ................................ 2009-006095
Jan. 12, 2010 (JP) ................................ 2010-004421

(51) Int. Cl.
*B24B 19/00* (2006.01)

(52) U.S. Cl.
USPC .......................................... 451/65; 451/180

(58) Field of Classification Search
USPC ....................................... 451/57, 58, 65, 180
See application file for complete search history.

(56) References Cited

U.S. PATENT DOCUMENTS

| | | | | |
|---|---|---|---|---|
| 1,562,587 A * | 11/1925 | Ranagan | ...................... | 451/483 |
| 2,284,483 A * | 5/1942 | Whitesell, Jr. | ................ | 408/234 |
| 2,793,473 A * | 5/1957 | Hickman | ....................... | 451/65 |
| 3,694,967 A * | 10/1972 | Stielper | ......................... | 451/180 |
| 3,742,652 A * | 7/1973 | Enders | .......................... | 451/180 |
| 4,738,055 A * | 4/1988 | Jackson et al. | ................. | 451/28 |
| 5,038,525 A * | 8/1991 | Gardner | ......................... | 451/439 |
| 5,925,191 A * | 7/1999 | Stein et al. | ....................... | 134/6 |
| 6,363,098 B1 | 3/2002 | Hagihara et al. | | |
| 6,810,552 B2 * | 11/2004 | Miyake et al. | ............... | 15/210.1 |
| 7,685,668 B2 * | 3/2010 | Tourigny | ................ | 15/104.001 |
| 7,966,715 B2 * | 6/2011 | Fujita et al. | .................. | 29/592.1 |
| 2003/0210731 A1 | 11/2003 | Fukui et al. | | |
| 2009/0258447 A1 | 10/2009 | Kurita | | |
| 2010/0077611 A1 * | 4/2010 | Fujita et al. | ..................... | 29/874 |
| 2011/0214454 A1 * | 9/2011 | Fujita et al. | ..................... | 65/33.1 |

FOREIGN PATENT DOCUMENTS

| | | |
|---|---|---|
| JP | 2001-097775 | 4/2001 |
| JP | 2002-068841 | 3/2002 |
| JP | 2003-335532 | 11/2003 |
| JP | 2004-155642 | 6/2004 |
| JP | 3647688 | 5/2005 |
| JP | 2005-319472 | 11/2005 |

OTHER PUBLICATIONS

Search report from E.P.O., mail date is Jul. 13, 2011.
English language Abstract of JP 2001-089171, corresponding to JP 3647688, Apr. 3, 2001.

* cited by examiner

*Primary Examiner* — Maurina Rachuba
(74) *Attorney, Agent, or Firm* — Greenblum & Bernstein, P.L.C.

(57) ABSTRACT

A carbon electrode grinding apparatus for shaping a front end of an arc discharge carbon electrode is provided with front end grinding blades configured to grind a front end surface of the carbon electrode, lateral surface grinding blades configured to grind a surface from the front end surface to a base end of the carbon electrode, and rotation means configured to rotate and drive the front end grinding blades and the lateral surface grinding blades around a rotation axis line coincident with an axis line of the carbon electrode.

9 Claims, 10 Drawing Sheets

CARBON ELECTRODE GRINDING APPARATUS

TECHNICAL FIELD

The present invention relates to a carbon electrode grinding apparatus and, more particularly, the structure of a grinding blade of a grinding apparatus suitable for grinding a carbon electrode that is used for heating and melting quartz powder to vitrify the quartz powder through arc discharge.

BACKGROUND OF THE INVENTION

A vitreous silica crucible used for pulling up single crystal silicon is mainly manufactured by an arc melting method. In this method, for example, quartz powder is deposited on an inner surface of a mold made of carbon with a predetermined thickness so as to form a quartz powder molded body of quartz deposition, a carbon electrode is mounted above the quartz powder molded body, and the quartz deposition is heated and vitrified by arc discharge, thereby manufacturing the vitreous silica crucible.

Japanese Patent No. 3647688 discloses a technology of manufacturing a vitreous silica crucible by arc melting, and Japanese Patent Application Laid Open Nos. 2002-68841 and 2001-097775 disclose a technology related to an electrode for arc discharge. In addition, Japanese Patent Application Laid Open No. 2003-335532 discloses a technology related to a distance between the electrodes for arc discharge.

Recently, the diameter of a manufactured silicon wafer is increased to exceed 300 mm by a request for efficiency of manufacturing a semiconductor device. Accordingly, a vitreous silica crucible which can pull up single crystal silicon having a large diameter has been required. In addition, improvement of crucible characteristics such as an inner surface state of the vitreous silica crucible, which directly influences on the characteristics of the single crystal silicon, has strongly been required by a request for miniaturization of a semiconductor device.

However, when a vitreous silica crucible having a large diameter of 30 inches to 40 inches is manufactured, the amount of power necessary for melting quartz powder is increased and thus vibration of an electrode, which generates at the time of start-up of arc discharge, is not negligible. When the electrode vibration generates at the time of start-up of arc discharge, current flowing through arc is changed, and the electrode is further vibrated by this current change, thereby further increasing the amplitude of the electrode vibration. As a result, the generated arc becomes unstable and influence on the state of the melted quartz powder is not negligible. In addition, if the electrode vibration is increased, minute pieces stripped from the electrode by the vibration are dropped and thus the characteristics of the vitreous silica crucible deteriorate. In addition, if the amplitude of the electrode vibration is increased, the electrode may be damaged.

In order to prevent the vibration of the electrode, the strength of the electrode should be increased by, for example, being made of a high-strength material or enlarging the diameter of the electrode. With respect to an arc discharge electrode used for manufacturing the vitreous silica crucible, however, this electrode is exhausted and the composition thereof is emitted to a quartz powder melting ambience, resulting in having influence on the characteristics of the crucible. Therefore, only the carbon electrode is used as an arc discharge electrode for manufacturing the vitreous silica crucible. In a case of enlarging the diameter of the electrode, power density deteriorates and, as a result, an arc output deteriorates. In this case, therefore, a processing temperature is decreased and a processed state becomes unstable, thereby having adverse influence on the characteristics of the crucible. In addition, generated fume (silica vapor) is attached to an upper portion of the electrode due to the decrease in the processing temperature, and the characteristics of the vitreous silica crucible can be deteriorated by the dropping of the attached fume. Thus, these means cannot be employed so as to prevent the vibration of the electrode. In addition, the influence of the electrode vibration is caused by the increase in the arc output accompanied by enlargement in the diameter of the crucible.

SUMMARY OF THE INVENTION

The present invention is contrived to solve the above problems and to obtain the following objects.
1. Electrode vibration is prevented.
2. Arc generation is facilitated at the time of start-up of power and stabilization thereafter is achieved.
3. Deterioration of crucible characteristics is prevented and improvement thereof is achieved.
4. A carbon electrode corresponding to large-output arc melting is provided.

The present inventors found that the above-described problems are solved by the shape of the front end of the electrode. In detail, it is preferable that a value of a ratio $R2/R1$ of a diameter $R2$ of a front end of a carbon electrode to a diameter $R1$ of a base end is set in a range of 0.6 to 0.8, a flat surface approximately perpendicular to an axis line is formed on the front end of the carbon electrode, a value of a ratio $L1/R2$ of the length $L1$ of a diameter reduction portion, which is formed at a front end position of the carbon electrode and reduced in diameter from a diameter $R3$ of the base end side to the diameter $R2$ of the front end, to the diameter $R2$ of the front end is set in a range of 3.5 to 7, a value of a ratio $R3/R1$ of the diameter $R3$ of the base end side of the diameter reduction portion to the diameter $R1$ of the base end of the carbon electrode is set in a range of 0.8 to 1, a value of a ratio $\alpha/\beta$ of an angle $\alpha$ between a lateral periphery surface of the diameter reduction portion and the flat surface and an angle ( between the lateral periphery surface of the base end and the flat surface is set to in a range of 7/9 to 17/18, and a half of an angle between the axis lines of the carbon electrodes is set in a range of 5( to 20( when arc is generated or power supply is started-up.

In order to realize this configuration, it is necessary to shape the front end of the carbon electrode so as to satisfy these conditions. However, as disclosed in Japanese Patent Application Laid Open No. 2001-097775, since the carbon electrode is very hard and chipping easily occurs, it is difficult to accurately machine the electrode in the above shape by a general machining method.

In order to solve the above problems, a carbon electrode grinding apparatus for shaping a front end of an arc discharge carbon electrode according to the present invention includes front end grinding blades configured to grind a front end surface of the carbon electrode, lateral surface grinding blades configured to grind a lateral periphery surface from the front end surface to a base end of the carbon electrode, and rotation means configured to rotate and drive the front end grinding blades and the lateral surface grinding blades around a rotation axis line coincident with an axis line of the carbon electrode. According to the carbon electrode grinding apparatus of the present invention, it is possible to grind and easily shape the front end of the carbon electrode so as to increase in diameter from the front end to the base end side by machining a very hard cylindrical material.

The rotation means rotates and drives the front end grinding blades and the lateral surface grinding blades around the rotation axis line coincident with the axis line of the carbon electrode. At this time, it is preferable that the carbon electrode which is an object to be ground and the grinding blades may be relatively rotated and moved. The rotation means can rotate the grinding blades in a state that the carbon electrode is fixed, rotate the carbon electrode in a state that the grinding blades are fixed, or rotate the carbon electrode and the grinding blades in a backward or forward direction. Therefore, by controlling the relative movement states of the grinding blades and the carbon electrode, it is possible to easily grind the carbon electrode, which is a very hard and frangible material, in an accurate shape and to set carbon electrode surface roughness in a roughness range in which arc discharge is smoothly generated without causing electrode vibration immediately after power supply for arc is started.

In the invention, the front end grinding blades and the lateral surface grinding blades may be attached to have a symmetrical position relationship using the rotation axis line as a symmetrical point. When the carbon electrode is rotatably ground around an axis line of the electrode, action points on the carbon electrode are symmetrical with respect to the rotation axis line such that force acting on the carbon electrode which is the object to be ground can be supported by the grinding blades located at the symmetrical positions. Thus, it is possible to perform grinding while cancelling forces perpendicular to the axis line, which act on the carbon electrode. Accordingly, it is possible to control the shape of the carbon electrode without causing chipping.

In the present invention, the lateral surface grinding blades may be provided so as to extend in a direction along the rotation axis line, and may be provided to become more distant from the rotation axis line from one end of the lateral surface grinding blades located at the front end grinding blade side toward the other end thereof. An electrode structure having the electrode diameter R1 necessary for maintaining electrode strength in an extremely drastic environment such as arc discharge and the diameter R2 of the front end necessary for obtaining suitable power density for obtaining stable arc discharge can be easily realized. Accordingly, it is possible to prevent electrode vibration at the time of start-up of power and to maintain stable arc generation during discharge to provide a heat source necessary for manufacture of the vitreous silica crucible.

In the present invention, the front end grinding blades may be provided so as to extend in a direction perpendicular to the rotation axis line. According to this configuration, it is possible to form the front end surface (flat surface) approximately perpendicular to the axis line on the front end of the carbon electrode by grinding. Therefore, it is possible to facilitate arc generation from an outer periphery portion of the flat surface and to stably generate arc discharge. Accordingly, it is possible to improve the characteristics (quality) of the vitreous silica crucible manufactured by arc-melting and to provide a vitreous silica crucible which is suitably used for pulling-up of the semiconductor single crystal.

In the present invention, the characteristics of the crucible refers to factors which influence on the characteristics of single crystal silicon pulled up from the vitreous silica crucible, such as vitrification state of the inner surface of the crucible, a bubble distribution in a thickness direction, the size of bubbles, the content of an OH group, the content of impurities such as alkali metal, alkaline earth metal or heavy metal, and distribution of irregularities in a height direction of the crucible.

In the invention, the rotation means may have four guide sections at positions divided in quarters with respect to the rotation axis line, the guide sections may include two front end blade-guide sections to which the front end grinding blades are attached and two lateral periphery blade-guide sections to which the lateral surface grinding blades are attached, a first attachment section may be formed in the front end blade-guide sections to attach each of the front end grinding blades, and a second attachment section may be formed in the lateral periphery blade-guide sections to attach each of the lateral surface grinding blades. According to this configuration, since the front end grinding blades and the lateral surface grinding blades can be individually replaced, it is possible to increase the life spans of the grinding blades and to reduce the replacement frequency by individually replacing the front end grinding blades and the lateral surface grinding blades according to the respective exhausted states. In addition, since the guide sections are divided in quarters, it is possible to position the grinding blades at the symmetrical positions with respect to the rotation axis lines, to individually replace the guide members, and to easily control the attachment positions of the guide members with respect to the rotation axis line. Even when damage such as chipping occurs in the grinding blades, the front end grinding blades and the lateral surface grinding blades can be easily replaced. When the grinding blades are exhausted or damaged, it is possible to easily recycle the grinding blades by shaping the grinding blades with low cost.

In the present invention, the front end grinding blades may be attached to two section of the guide sections which are not adjacent to each other around the rotation axis line, and the lateral surface grinding blades may be attached to the other two sections of the guide sections which are not adjacent to each other around the rotation axis line. The front end grinding blades grind the front end surface (flat surface) of the carbon electrode at two positions which are symmetrical in a direction around the axis line of the carbon electrode which is the object to be ground, and the lateral surface grinding blades grind the lateral periphery surface (truncated cone surface) of the front end of the carbon electrode at two positions which are symmetrical in a direction around the axis line of the carbon electrode which is the object to be ground. For this reason, extra force is not applied to the carbon electrode in the direction perpendicular to the axis line and it is possible to prevent the state in which the grinding can not be performed, caused by the overload of the rotation means due to an excessive increasing of friction resistance when the grinding is performed at three positions or more in a direction around the axis line. That is, even if a driving source has an output to an extent that grinding can not be performed when the grinding blades come in contact with the carbon electrode at three positions or more, it is possible to relatively rotate the grinding blades and the carbon electrode so as to perform grinding with the driving source if the grinding blades come in contact with the carbon electrode at two positions. Therefore, it is possible to reduce the manufacturing cost of the apparatus.

In the present invention, the front end blade-guide sections to which the front end grinding blades are attached and the lateral periphery blade-guide sections to which the lateral surface grinding blades are attached may be arranged so as to be adjacent to each other around the rotation axis line. The guide sections to which the front end grinding blades are attached do not perform grinding by the lateral surface grinding blades, and the guide sections to which the lateral surface grinding blades are attached do not perform grinding by the front end grinding blades, such that in boundary portions between the front end grinding blades and the lateral surface grinding blades, in which the grinding capability deteriorates most easily when the grinding blades are exhausted, that is, the portions in which grinding is performed in correspondence with the outer periphery portion of the front end surface (flat surface) of the front end of the carbon electrode, it is possible to prevent the grinding blades from being dulled to deteriorate the grinding capability. Accordingly, it is possible to increase the life span of the grinding blade.

In the present invention, a dummy blade may be formed in at least one of the guide sections, to which the front end grinding blades and the lateral surface grinding blades are not attached. By this configuration, in the plurality of guide sections, since the sections to which the grinding blades are attached and the sections to which the grinding blades are not attached can have the same shape, a plurality of guide sections having the same shape can be prepared, manufacturing cost can be reduced, and the grinding blades can be easily replaced. The dummy blade may be set such that the distance between the dummy blade and the rotation axis line is greater than the distance between the grinding blade and the rotation axis line or the grinding blade may not be attached.

In the present invention, by shaping the front end of the carbon electrode using the carbon electrode grinding apparatus, the value of ratio L1/R2 of the length L1 of the diameter reduction portion to the diameter R2 of the front end is easily set in a range of 3.5 to 7. Accordingly, one carbon electrode may come in contact with another carbon electrode only at one place. In other words, during arc discharge from the starting of power supply, by setting the values of the diameters R3 and R2 such that a portion having a nearest distance between one carbon electrode and another carbon electrode is one point, one linear portion or one surface, it is possible to generate arc discharge in the portion having the nearest distance, to facilitate arc generation, and to stably generate arc discharge.

In the present invention, by shaping the front end of the carbon electrode using the carbon electrode grinding apparatus, the value of the ratio R3/R1 of the diameter R3 of the base end side of the diameter reduction portion to the diameter R1 of the base end of the carbon electrode is easily set in a range of 0.8 to 1, and thereby the number of portions having the nearest distance is one. Accordingly, it is possible to prevent discharge in a portion other than the front end of the electrode due to an unequal electric field and to obtain stable arc generation.

In the present invention, by shaping the front end of the carbon electrode using the carbon electrode grinding apparatus, the value of the ratio (/( of the angle ( between the lateral periphery surface of the diameter reduction portion and the flat surface and the angle ( between the lateral periphery surface of the base end and the flat surface is easily set to in a range of 7/9 to 17/18. Accordingly, it is possible to prevent discharge in a portion other than the front end of the electrode due to an unequal electric field and to more stably obtain arc generation.

In the present invention, by shaping the front end of the carbon electrode using the carbon electrode grinding apparatus, a half of the angle between the axis lines of the carbon electrodes is easily set in a range of 5( to 20(. Accordingly, one carbon electrode may be in contact with another carbon electrode only at one place. Alternatively, during arc discharge from the starting of power supply, a portion having a nearest distance between one carbon electrode and another carbon electrode may be one point, one linear portion or one surface. Therefore, it is possible to prevent electrode vibration, to facilitate arc generation, and to stably generate arc discharge by generating arc discharge in the portion having may be one point, one linear portion or one surface. Therefore, it is possible to prevent electrode vibration, to facilitate arc generation, and to stably generate arc discharge by generating arc discharge in the portion having the nearest distance.

In addition, the carbon electrode grinding apparatus of the present invention can shape both a carbon electrode used in a manufacturing method of adding quartz powder during arc discharge, which is called a thermal spraying method, and a carbon electrode used in a manufacturing method in which quartz powder is not added during arc discharge, which is called a rotation molding method.

According to the present invention, since it is possible to prevent electrode vibration, to facilitate arc generation, and to stably generate arc discharge, even in a crucible having a large diameter, it is possible to provide a carbon electrode grinding apparatus which is capable of machining a carbon electrode capable of preventing in-plane unevenness of the characteristics in the inner surface of the vitreous silica crucible melted by generated arc flame or deterioration of the crucible surface characteristics.

BRIEF DESCRIPTION OF THE DRAWINGS

The above and other objects, features and advantages of this invention will become more apparent by reference to the following detailed description of the invention taken in conjunction with the accompanying drawings, wherein:

FIGS. 2A and 2B are enlarged assembly diagrams of grinding means of the carbon electrode grinding apparatus according to the embodiment of the present invention, wherein FIG. 2A is a plan diagram when viewed in a direction perpendicular to a rotation axis line 20L and FIG. 2B is a plan diagram when viewed in a direction of the rotation axis line 20L;

FIGS. 3A to 3D are enlarged exploded diagrams of a guide portion of the carbon electrode grinding apparatus according to the embodiment of the present invention, wherein FIG. 3A is a plan diagram of a guide section 25B when viewed in the direction of the rotation axis line 20L, FIG. 3B is a plan diagram of the guide section 25B when viewed in the direction perpendicular to the rotation axis line 20L, FIG. 3C is a plan diagram of a guide section 25A when viewed in the direction of the rotation axis line 20L, and FIG. 3D is a plan diagram of the guide section 25A when viewed in the direction perpendicular to the rotation axis line 20L;

FIGS. 11A and 11B are schematic diagrams showing a carbon electrode according to another embodiment of the invention, wherein FIG. 11A is a diagram showing a shape in which the diameter of the electrode is continuously reduced and FIG. 11B is a diagram showing a shape in which a front end of the electrode is rounded.

DETAILED DESCRIPTION OF THE EMBODIMENT

Hereinafter, a carbon electrode grinding apparatus according to an embodiment of the present invention will be described with reference to the accompanying drawings.

Figure 1:
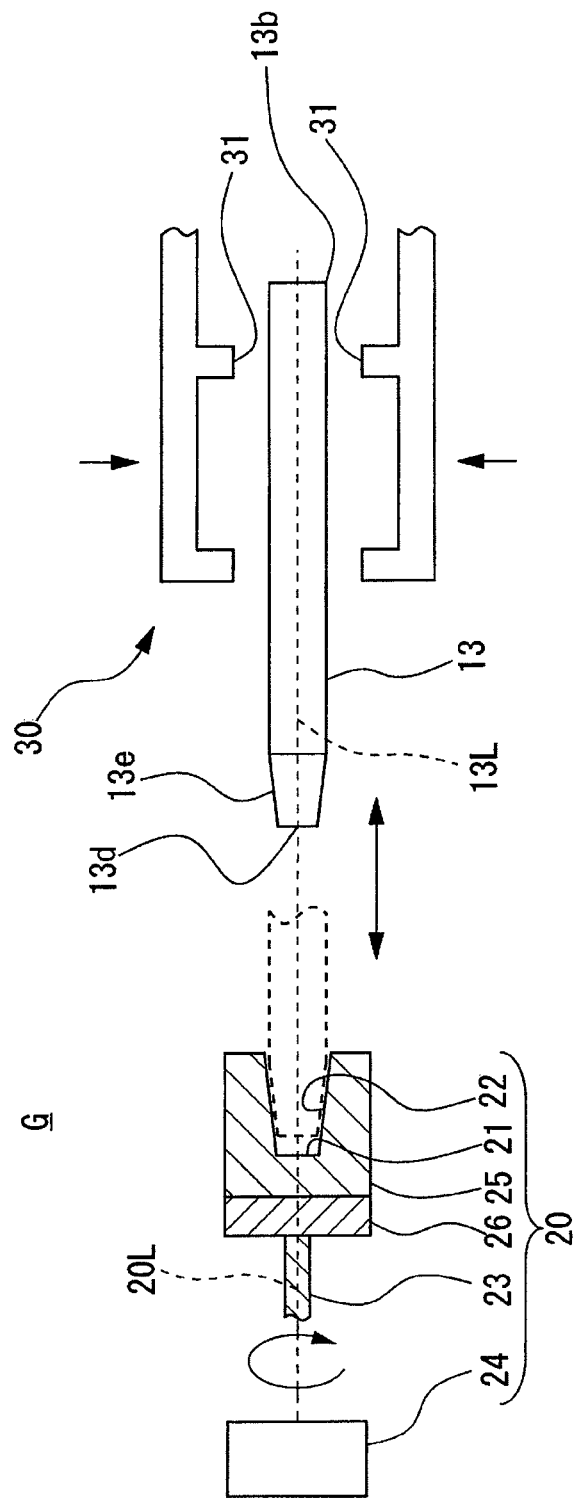
FIG. 1 is a schematic partial cross-sectional view showing a carbon electrode grinding apparatus according to an embodiment of the present invention.
Figures 2A, 2B:
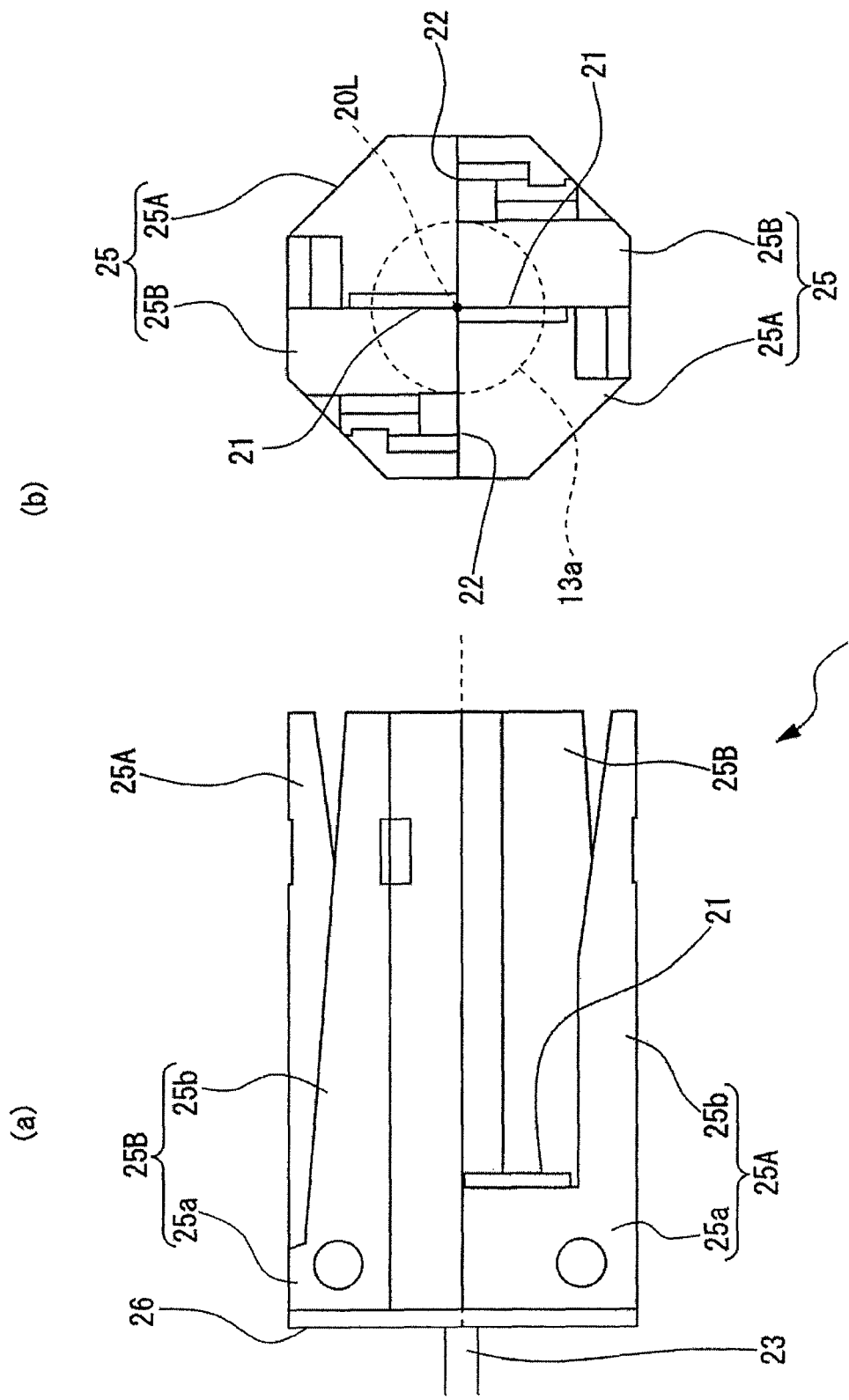
Figure 3A:
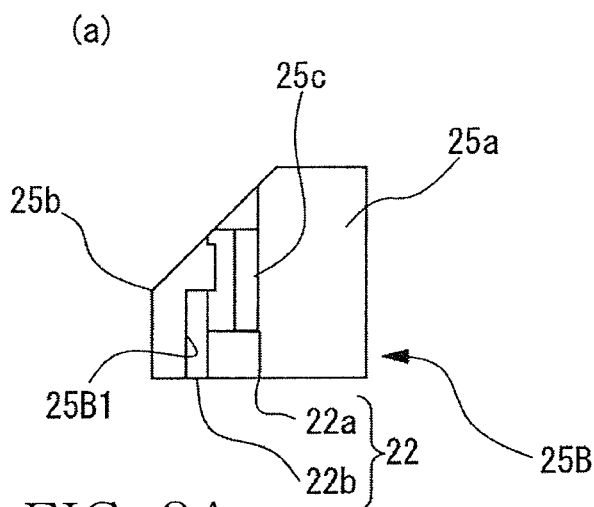
Figure 3C:
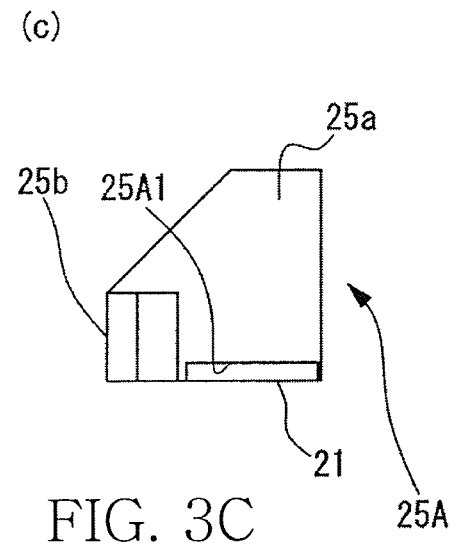
Figure 3B:
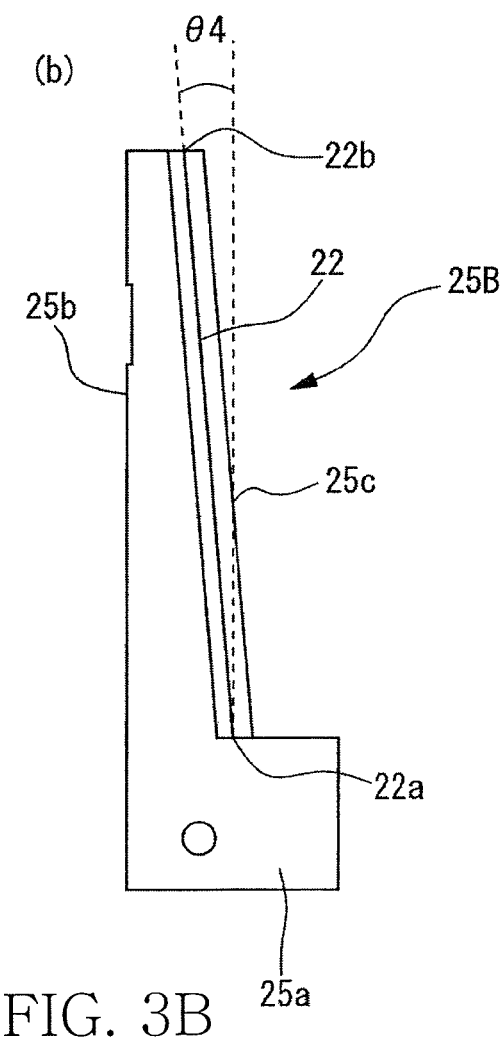
Figure 3D:
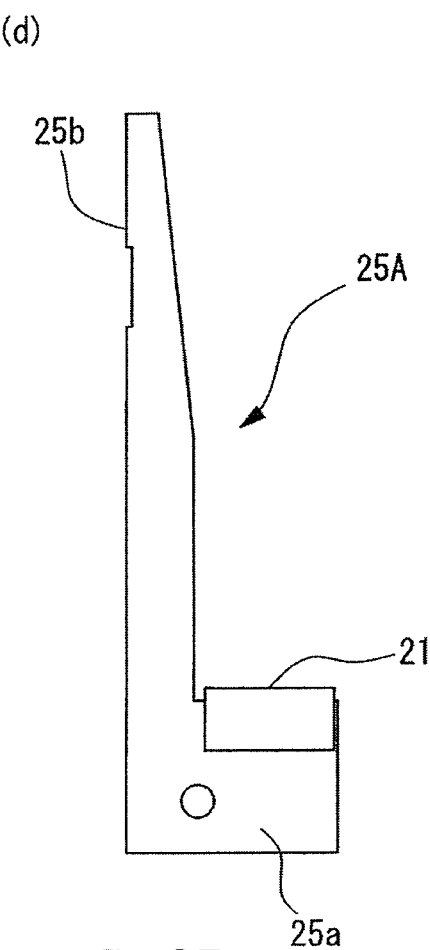

FIG. 1 is a schematic partial cross-sectional view showing a carbon electrode grinding apparatus according to the present embodiment, FIGS. 2A and 2B are enlarged assembly diagrams showing a state in which a guide section and a grinding blade are assembled, and FIGS. 3A to 3D are enlarged exploded diagrams showing the guide section and the grinding blade of FIG. 1. In the drawing, reference numeral G is a carbon electrode grinding apparatus.

The carbon electrode grinding apparatus G of the present embodiment is suitably used for grinding and shaping a carbon electrode used for manufacturing a vitreous silica crucible having a diameter of 24 inches or more. If the carbon electrode grinding apparatus G, however, is used for arc-melting a non-conductor, kinds of materials to be melted, the diameter of the crucible, a device output, and use as heat source are not limited. The present invention is not limited to this configuration.

As shown in FIG. 1, the carbon electrode grinding apparatus G of this embodiment of the invention shapes a carbon electrode 13 for performing arch discharge, and includes grinding means 20 for grinding the carbon electrode 13 and holding means 30 for holding the carbon electrode 13 during grinding.

The grinding means 20 has grinding blades 21 and 22 and a rotation shaft 23 for rotating the grinding blades 21 and 22. As shown in FIGS. 1 to 3, the grinding blades 21 and 22 include a front end grinding blade 21 for grinding a front end surface 13d of the carbon electrode 13 and a lateral surface grinding blade 22 for grinding a lateral periphery surface 13e which is increased in diameter from a front end 13a of the carbon electrode 13 to a base end 13b. The front end grinding blade 21 and the lateral surface grinding blade 22 are formed on the rotation shaft 23, which is rotatable around a rotation axis line 20L coincident with an axis line 13L of the carbon electrode 13, through a guide section 25.

As shown in FIGS. 1 to 3, the front end grinding blade 21 is formed to have an approximately rectangular flat plate and one side (ridge) of which functions as a grinding blade and comes in contact with the carbon electrode 13. Moreover, the front end grinding blade 21 is attached to the rotation shaft 23 such that a ground surface of the carbon electrode 13 is disposed in a direction perpendicular to the rotation shaft 23.

As shown in FIGS. 1 to 3, the lateral surface grinding blade 22 is formed to have an approximately rectangular flat plate, one side (ridge line) of which functions as a grinding blade and comes in contact with the carbon electrode 13. Moreover, the lateral surface grinding blade 22 is attached to the rotation shaft 23 such that a ground surface of the carbon electrode 13 is disposed in a direction along the rotation shaft 23. In particular, the lateral surface grinding blade 22 is formed such that a blade surface thereof becomes more distant from the rotation axis line 20L from one end 22a of the lateral surface grinding blade 22 close to the front end grinding blade 21 side toward the other end 22b.

The rotation shaft 23 is rotated and driven by a driving source 24 and has a flange section 26 for attaching the guide sections 25. The flange section has a shape in which the diameter thereof is increased from the rotation shaft 23, and the diameter thereof is increased in the direction perpendicular to the rotation axis line of the rotation shaft 23. The rotation shaft 23, the driving source 24, the guide section 25 and the flange section 26 configure rotation means.

As shown in FIGS. 1 to 3, four guide sections 25 are attached to the flange section 26 at positions divided in quarters with respect to the rotation axis line 20L. The guide sections 25 include two front end blade-guide sections 25A to which the front end grinding blade 21 is attached and two lateral periphery blade-guide sections 25B to which the lateral surface grinding blade is attached, all of which are offset and attached so as to be symmetrical with respect to the rotation axis line 20L.

That is, the front end blade-guide sections 25A and the lateral periphery blade-guide sections 25B are alternately disposed along the circumferential direction of the rotation axis line 20L, and thereby the front end blade-guide sections 25A are not adjacent to each other and the lateral periphery blade-guide sections 25B are not adjacent to each other around the rotation axis line 20L. The front end grinding blade 21 is attached to each of the two front end blade-guide sections 25A, and the lateral surface grinding blade 22 is attached to each of the two lateral periphery blade-guide sections 25B.

The guide sections 25A and 25B are attached to the flange section 26, and include a base portion 25a extending in the direction perpendicular to the rotation axis line 20L and a guide portion 25b extending from the base portion 25a in a direction parallel to the rotation axis line 20L and erected at a position separated from the rotation axis line 20L. A surface of the guide portion 25b facing the rotation axis line 20L is inclined from the base portion 25a to the front end side of the guide portion 25b to become more distant from the rotation axis line 20L.

An attachment section 25A1 for attaching the front end grinding blade 21 is formed in the base portion 25a of the front end blade-guide section 25A. The front end grinding blade 21 is attached such that the blade surface is located in an extension direction of the base portion 25a, that is, in the direction perpendicular to the rotation axis line 20L. In the front end blade-guide section 25A, the blade surface of the front end grinding blade 21 extending in the direction perpendicular to the rotation axis line 20L reaches the base end position of the guide portion 25b from the rotation axis line 20L and has a size equal to or slightly greater than the radius of the front end surface (flat surface; 13d) of the carbon electrode 13. The attachment section 25A1 is a concave portion formed in the base portion 25a, and fixes the blade edge of the front end grinding blade 21 in a state of protruding from the surface of the base portion 25a in the direction of the rotation axis line 20L.

In addition, an attachment section 25B1 for attaching the lateral surface grinding blade 22 is formed in the guide portion 25b of the lateral periphery blade-guide section 25B. The lateral surface grinding blade 22 is attached such that the blade surface is slightly inclined from the direction parallel to the rotation axis line 20L. In lateral periphery blade-guide section 25B, one end 22a of the lateral surface grinding blade 22 located at the front end grinding blade 21 side is positioned so as to be equal to an outer peripheral position of the front end surface (flat surface; 13d) of the carbon electrode 13 or be slightly closer to the rotation axis line 20L, and the other end 22b thereof is positioned so as to be separated from the rotation axis line 20L by a distance greater than a distance between one end 22a and the rotation axis line 20L. As a result, the lateral surface grinding blade 22 is set to form an angle θ4 with the rotation axis line 20L. The angle θ4 is set to be equal to an angle between the lateral periphery surface 13e of the carbon electrode 13 and the electrode axis line 13L, as described below.

The attachment section 25B1 is a concave portion formed in the guide portion 25b, and fixes the blade edge of the lateral surface grinding blade 22 in a state of protruding from the surface of the guide portion 25b in a direction closer to the rotation axis line 20L. In addition, the lateral surface grinding blade 22 is attached to the guide portion 25b in a state of being pressed by an attachment member 25c so as to be pressed toward the guide portion 25b of the lateral periphery blade-guide section 25B over the entire length of the blade. The attachment member 25c is attached or detached to the guide portion 25b by means such as screw attachment, and the lateral surface grinding blade 22 can be replaced.

In the attachment sections 25A1 and 25B1, the grinding blades 21 and 22 are attached by selecting any one of four sides having the same length as one side (ridge line) which comes in contact with the carbon electrode 13 so as to perform grinding.

Since the four guide sections 25 assembled as the grinding means 20 have inner side surfaces facing the rotation axis line 20L and widen from the base portion 25a to the front end side of the guide portion 25b, the guide portions function as a guide for guiding the carbon electrode 13 to the grinding position when the front end 13a of the carbon electrode 13 approaches the guide portion.

The guide sections 25 are rotated around the rotation axis line 20L such that the trajectory of the blade edge (one side which becomes the blade) of the front end grinding blade 21 and the lateral surface grinding blade 22 is coincident with the front end surface (flat surface; 13d) and the lateral periphery surface 13e of the below-described carbon electrode 13. In the lateral surface grinding blades 22 which face each other, since the positions which come in contact with the carbon electrode 13 during grinding are symmetrical with respect to the rotation axis line 20L, the reactions of the grinding forces acting in the direction perpendicular to the rotation axis line 20L and separated from the rotation axis line 20L during grinding are mutually removed, thereby preventing excessive force from acting on the rotation shaft 23 in the direction perpendicular to the rotation axis line 20L.

The holding means 30 holds the carbon electrode by a plurality of contact portions 31 such that the axis line 13L of the carbon electrode 13 coincides with the rotation axis line 20L of the grinding means 20. In this state, the holding means 30 may be positioned so as to reciprocally travel the carbon electrode 13 in the direction of the axis line 13L by a reciprocal driving unit (not shown).

The carbon electrode 13 which is ground by the carbon electrode grinding apparatus G according to this embodiment of the invention is attached to a vitreous silica crucible manufacturing apparatus 1.

Figure 4:
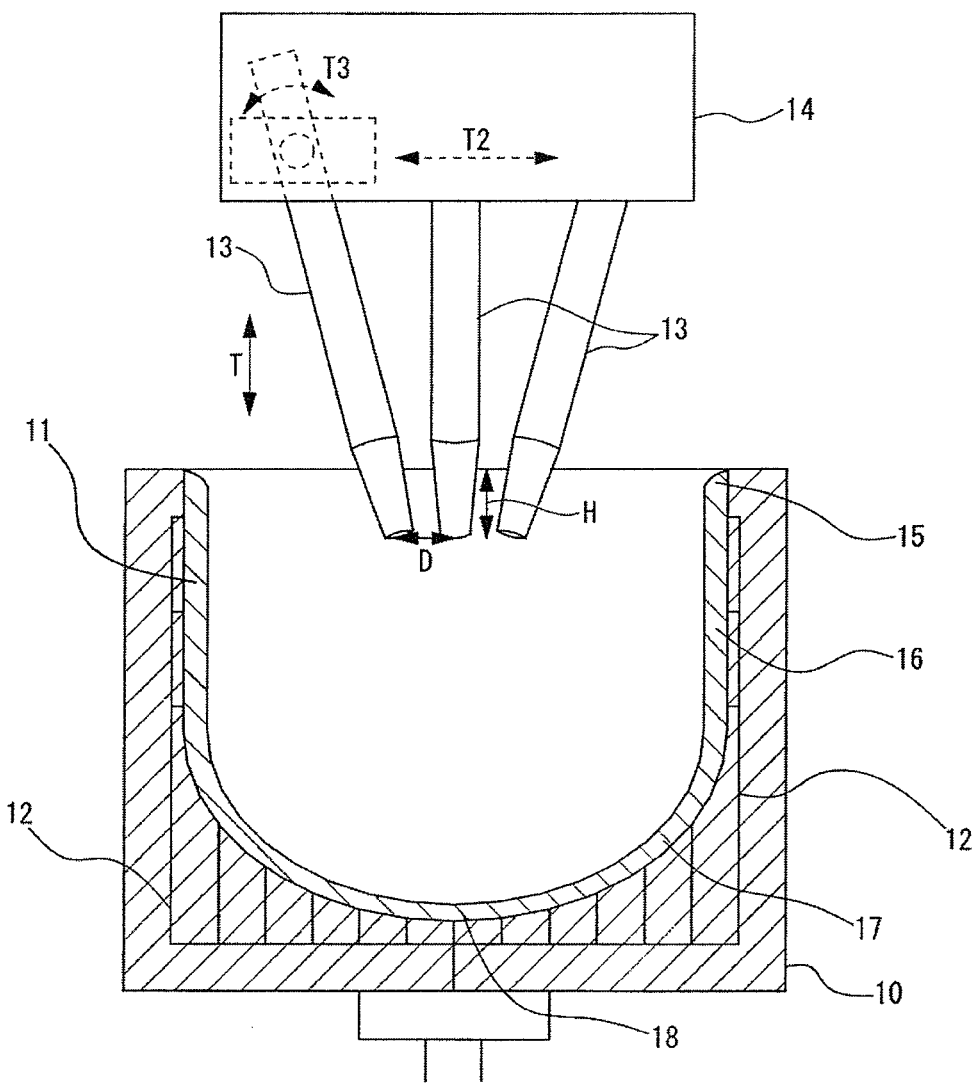
FIG. 4 is a schematic front diagram showing a vitreous silica crucible manufacturing apparatus according to an embodiment of the present invention.

FIG. 4 is a schematic diagram showing a vitreous silica crucible manufacturing apparatus.

As shown in FIG. 4, the vitreous silica crucible manufacturing apparatus 1 has a mold 10 which defines an outer shape of the vitreous silica crucible, the mold 10 is rotatable by rotation means (not shown), and raw material powder (quartz powder) is filled in the rotating mold 10 with a predetermined thickness so as to form a quartz powder molded body 11. A plurality of ventilation holes 12 are formed in the mold 10. The ventilation hole 12 penetrates to an inner surface of the mold 10 and the other end of which is connected to depressurization means (not shown) such that the inside of the quartz powder molded body 11 can be depressurized. Arc heating carbon electrodes 13, 13 and 13 connected to power supplying means (not shown) are formed above the mold 10 such that the quartz powder molded body 11 can be heated. With respect to three carbon electrodes 13, 13 and 13, a vertical position denoted by an arrow T of the drawing and a distance D between the electrodes denoted by an arrow T2 can be set by electrode position setting means 20.

Here, the quartz powder is not limited to quartz but includes powders of known materials as a raw material of the vitreous silica crucible, such as quartz or silica sand including silicon dioxide (silica). The powders may be a crystal state, an amorphous state, and a glass state, and the internal structure thereof is not limited to only quartz.

The vitreous silica crucible manufacturing apparatus 1 is a high-output device for heating and melting a non-conductive object (quartz powder) by arc discharge through the plurality of carbon electrodes 13, 13 and 13 in an output range of 300 kVA to 12,000 kVA.

The vitreous silica crucible manufacturing apparatus 1 controls the distance between the front ends of the electrodes to an optimal position while maintaining the angle θ1 between the carbon electrodes 13 so as to supply power such that power density of the carbon electrodes 13 is 40 to 1,700 kVA/cm$^2$ and more preferably 40 to 450 kVA/cm$^2$, when arc discharge is performed at the time of manufacture of the vitreous silica crucible.

In detail, the vitreous silica crucible manufacturing apparatus 1 supplies the power of 300 to 12,000 kVA to the carbon electrodes 13 with the diameter R2. If the power density is less than the above range, stable arc cannot be maintained. If the power density is in the above range, however, Lorentz force which causes the increase in the vibration of the electrode can be in an allowable range and thus the generated vibration of the electrode can be stabilized.

Here, the power density refers to the amount of supplied power per unit cross-sectional area of the cross section of the electrode perpendicular to the electrode center axis 13L in the carbon electrode 13. In detail, the power density is expressed by a ratio of power supplied to one electrode to the cross-sectional area of the electrode perpendicular to the electrode center axis 13L at a position of an axial length of about 15 to 25 mm and more preferably 20 mm from the front end 13a of the electrode, that is, amount of supplied power (kVA)/cross-sectional area of the electrode (cm$^2$).

Figure 5:
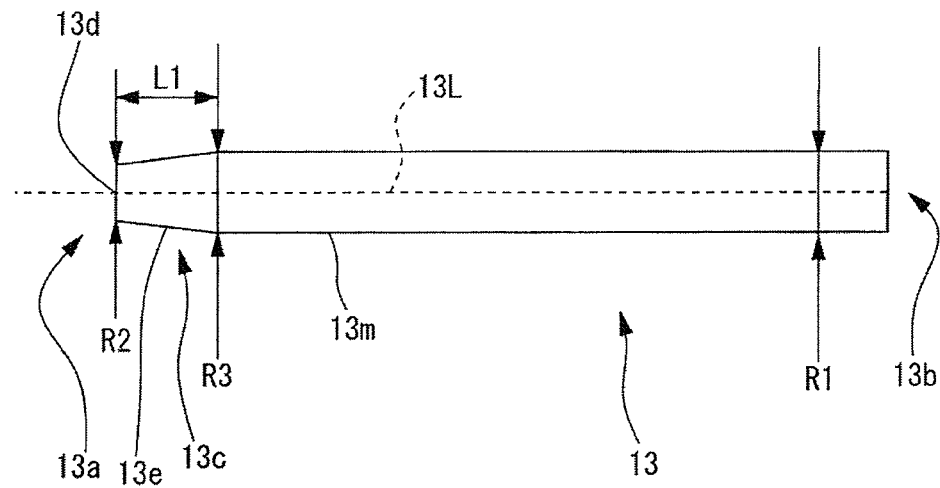
FIG. 5 is a schematic diagram showing a carbon electrode of the vitreous silica crucible manufacturing apparatus according to the embodiment of the present invention.
Figure 6:
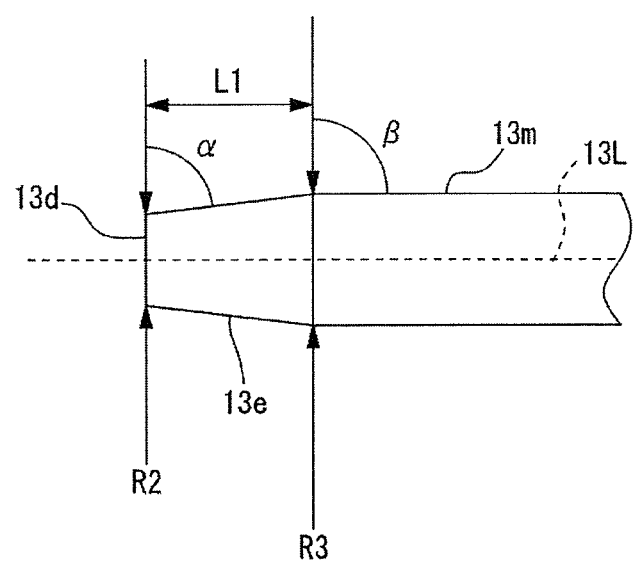
FIG. 6 is an enlarged diagram of a front end of the carbon electrode of FIG. 5.

FIG. 5 is a schematic diagram showing the carbon electrode 13 according to this embodiment of the invention and FIG. 6 is an enlarged diagram of the front end of the carbon electrode shown in FIG. 5.

The carbon electrode 13 according to this embodiment of the invention is an approximately cylindrical rod-like body. In the carbon electrode 13, a base end 13b has an approximately uniform diameter R1, and a ratio R2/R1 of the diameter R2 of the front end 13a to the diameter R1 of the base end 13b is set in a range of 0.6 to 0.8. Moreover, a flat surface 13d is formed on the front end 13a so as to be approximately perpendicular to an axis line 13L of the carbon electrode 13, and a diameter reduction portion 13c is formed in the front end 13a such that the diameter R2 of the front end 13a is smaller than the diameter R1 of the base end 13b.

In this embodiment of the invention, the diameter reduction portion 13c has an approximately truncated conical shape of which diameter is gradually reduced from the diameter R3 of the base end 13b to the diameter R2 of the front end 13a. A value of a ratio L1/R2 of the length L1 of the diameter reduction portion 13c to the diameter R2 of the front end 13a is set in a range of 3.5 to 7. A value of a ratio R3/R1 of the diameter R3 of the base end side of the diameter reduction portion 13c to the diameter R1 of the base end of the carbon electrode is set in a range of 0.8 to 1. In this embodiment of the invention, the diameter R3 of the base end side of the diameter reduction portion 13c is equal to the diameter R1 of the base end of the electrode.

A value of a ratio α/β of an angle α between a lateral periphery surface 13e of the diameter reduction portion 13c and the flat surface 13d and an angle β between the lateral periphery surface 13m of the base end 13b side and the flat surface 13d is set in a range of 7/9 to 17/18. In this embodiment of the invention, the angle β is set to 90°.

Figure 7:
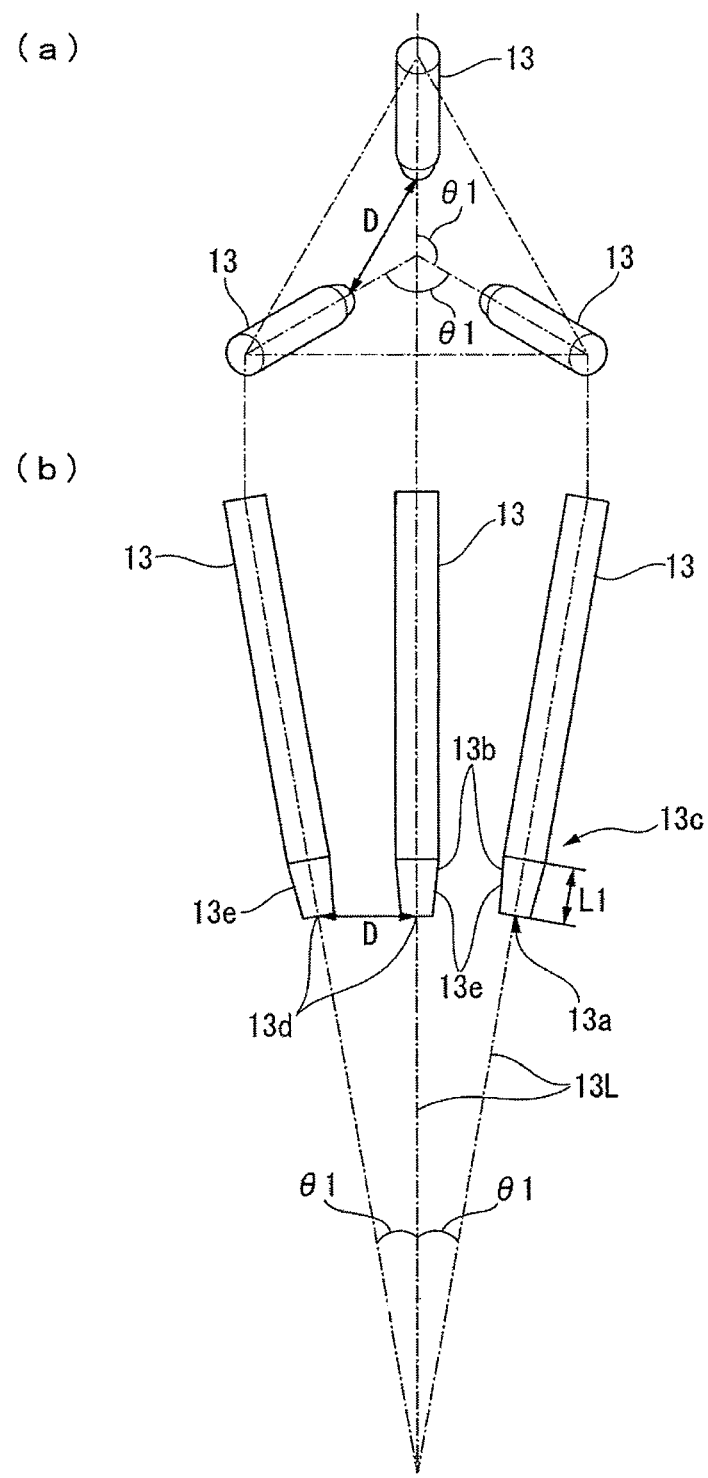
FIG. 7 is a schematic diagram showing the positions of the carbon electrodes of the vitreous silica crucible manufacturing apparatus.

FIG. 7 is a schematic diagram showing the positions of the carbon electrodes of the vitreous silica crucible manufacturing apparatus.

The carbon electrodes 13, 13 and 13 are electrode rods having the same shape to perform for example, 3-phase alternating current (R-phase, S-phase and T-phase) arc discharge. Furthermore, the carbon electrodes 13, 13 and 13 have a reverse triangular pyramid shape, an apex of which is located on a lower side, as shown in FIGS. 4 and 7, and the angle between the axis lines 13L of the electrode rods is θ1.

Figure 8:
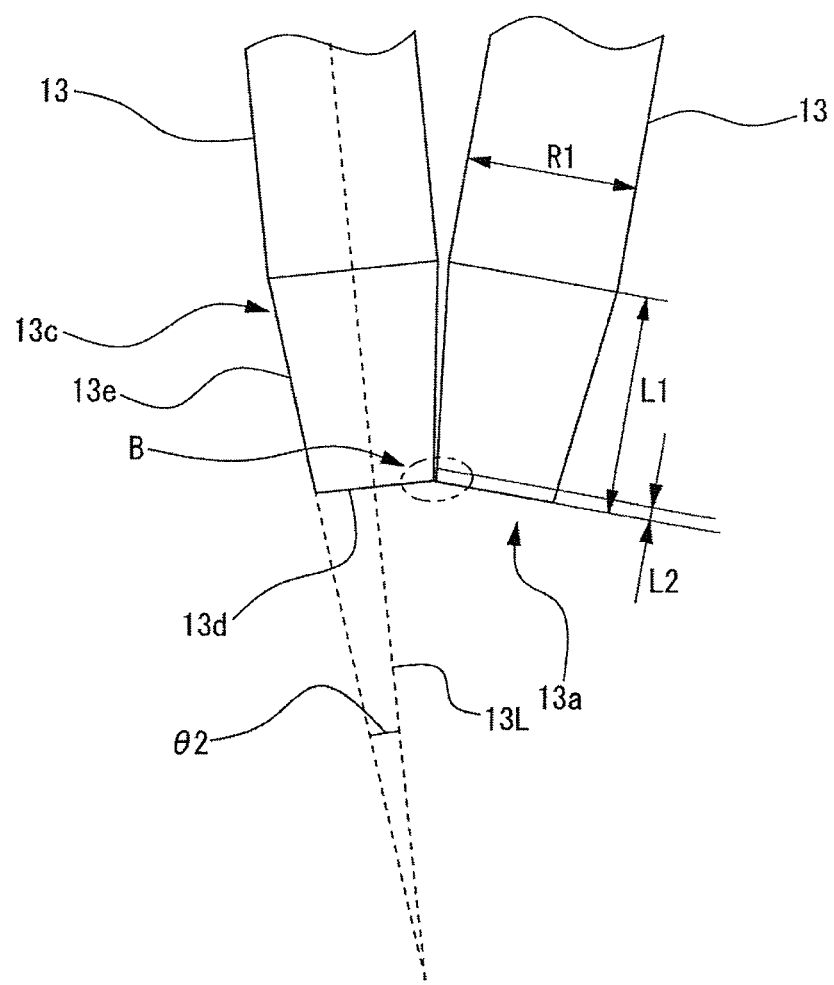
FIG. 8 is an enlarged schematic diagram showing a front end of the carbon electrode in a contact state in the vitreous silica crucible manufacturing apparatus.

FIG. 8 is an enlarged schematic diagram showing the front ends of the carbon electrodes in a state where the carbon electrodes come in contact with each other in the vitreous silica crucible manufacturing apparatus.

As shown in FIG. 8, in the carbon electrode 13, if the carbon electrodes 13 come in contact with each other when power supply is started, the angle (2 between the lateral periphery surface 13e and the axis line 13L of the carbon electrode 13 is set such that the contact position is located in the range of the diameter reduction portion 13c and is preferably (1>2((2. However, the angle is not limited thereto, if the contact position is in the range of the diameter reduction portion 13c, for example, even when the angle becomes (1=2 ((2 and the contact position is located in the vicinity of a boundary between the diameter reduction portion 13c, which is the truncated cone, and the uniform diameter portion. In addition, the angle (2 satisfies a following equation, that is, (2=90(−(.

The length L1 of the diameter reduction portion 13c becomes L2<L1 with respect to the distance L2 from the front end 13a to the contact position, and a ratio L2/R1 of the distance L2 from the front end 13a to the contact position to the diameter R1 of the carbon electrode 13 is set in a range of 0 to 0.9. Since the lengths L1 and L2 depend on the angle θ1 between the axis lines 13L of the carbon electrodes and the angle θ2 between the lateral periphery surface 13e and the axis line 13L of the carbon electrode 13, these ranges are set to satisfy the above condition.

In the carbon electrode 13, a ratio L1/R1 of a length LL exhausted per arc discharge unit time (1 minute) to the diameter R1 of the base end 13b having the uniform diameter portion is set in a range of 0.02 to 0.6. The diameter R1 of the carbon electrode is determined according to conditions such as an arc discharge output, the amount of raw material powder to be melted, which is defined by the diameter (size) of the vitreous silica crucible, a temperature of a melting process, a necessary arc discharge duration, and necessary electrode strength. In addition, the diameter R1 of the carbon electrode 13 is defined on the purpose of preventing the generation of the electrode vibration. In detail, in the manufacture of the vitreous silica crucible of 32 inches, the length of about 120 mm is exhausted for minutes, that is, the length of about 2 mm per minute is exhausted. At this time, the diameter R1 of the carbon electrode 13 becomes 020 to 120 mm.

The carbon electrode 13 is formed of high-purity carbon grains having a grain diameter of 0.3 mm or less, preferably 0.1 mm or less, and more preferably 0.05 mm or less. When the density of this carbon electrode 13 is 1.30 to 1.80 g/cm³ or 1.30 to 1.70 g/cm³, a difference in density between the carbon electrodes disposed in the phases of the electrodes may become 0.2 g/cm³ or less. By such high homogeneity, the generated arc becomes stable and the local deficiency of the carbon electrode 13 can be prevented.

The carbon electrode 13 may be formed by extrusion molding or CIP (Cold Isostatic Pressing) molding using a raw material such as coke, for example, coal based pitch coke, and a bonding material such as coal-tar pitch, for example, a mixed material obtained by carbonizing coal based pitch coke as grains. The carbon electrode 13 has wholly a cylindrical shape and the front end thereof is gradually tapered down. The method of manufacturing the carbon electrode by extrusion molding may use following processes: for example, heating and mixing a carbon-based raw material adjusted to obtain a desired grain diameter and the bonding material; performing the extrusion molding on the mixed material obtained by heating and mixing at 130 to 200° C.; baking the resultant by the extrusion molding to obtain a graphitic material graphitized at 2600 to 3100 (C; and working the graphitic material to perform purification by halogen-based gas such as chlorine under heating of 2000 (C or more. The method of manufacturing the carbon electrode by CIP molding may use following processes: heating and mixing a carbon material adjusted to obtain a desired grain diameter and a bonding material; pulverizing and sieving the obtained mixed material; performing CIP molding on the obtained secondary grains; baking the resultant by the CIP molding to obtain a graphitic material graphitized at 2600 to 3100 (C; and working the graphitic material to perform purification by halogen-based gas such as chlorine under heating of 2000 (C or more.

In the carbon electrode grinding apparatus G of this embodiment of the invention, since the carbon electrode 13 held by the holding means 30 moves in the direction of the axis line 13L, the carbon electrode 13 is approached and pressed to the grinding means 20 in a state in which the axis line 13L and the rotation axis line 20L are coincident with each other such that the front end 13a comes in contact with the front end grinding blade 21 and the lateral surface grinding blade 22. For this reason, the front end 13a is ground. As a result, it is possible to shape the carbon electrode 13 with excellent arc discharge characteristics by forming the front end surface 13d and the lateral periphery surface 13e in the front end 13a of the carbon electrode without receiving excessive reaction in one direction separated from the rotation axis line 20L and in the direction perpendicular to the rotation axis line 20L. At this time, since the number of front end grinding blades 21 for grinding the front end surface 13d is two and the number of lateral surface grinding blades 22 for grinding the lateral periphery surface 13e is two, a shaping process can be performed while preventing force acting on the grinding blades 21 and 22 from becoming overload of the driving unit.

In addition, since the carbon electrode grinding apparatus G of this embodiment of the invention grinds the carbon electrode 13 at positions symmetrical with respect to the rotation axis line 20L, it is possible to control the shape of the carbon electrode without causing chipping.

In the carbon electrode grinding apparatus G of this embodiment of the invention, since the front end grinding blade 21 and the lateral surface grinding blade 22 can be independently replaced, the front end grinding blade 21 and the lateral surface grinding blade 22 can be individually replaced according to the respective exhausted states. Thus, it is possible to shorten a replacement time, to shorten a reproduction time by polishing of the exhausted grinding blades 21 and 22, to simplify the configuration of the grinding blade, and to reduce manufacturing cost thereof. In addition, since the grinding blades 21 and 22 are attached through selecting one of four sides as the grinding blade, the sides of the grinding blades 21 and 22 which function as the grinding blades can be individually replaced according to the respective exhausted states. Thus, it is possible to shorten a replacement time, to shorten a reproduction time by polishing of the exhausted grinding blades 21 and 22, to simplify the configuration of the grinding blade, and to reduce manufacturing cost thereof.

According to the carbon electrode grinding apparatus G of this embodiment of the invention, as described above, the shaped carbon electrode 13 is attached to the vitreous silica crucible manufacturing apparatus 1 and the electrode position is set at the time of power supply and arc generation, and thereby the distance between the carbon electrodes 13 at the position of the outer periphery 13da of the flat surface 13d is set to be the shortest. Therefore, the vitreous silica crucible manufacturing apparatus 1 can simultaneously prevent arc generation and electrode vibration generation in a portion other than the front end 13a and can realize optimal current density in arc generation, resulting in facilitating arc generation and stably generating arc discharge. Since the vitreous silica crucible manufacturing apparatus 1 can realize the stable arc, it is possible to prevent minute pieces from being dropped from the carbon electrode 13 onto the inner surface of the crucible, which is an object to be melted, and being introduced thereinto.

According to the carbon electrode grinding apparatus G of this embodiment of the invention, since the vitreous silica crucible manufacturing apparatus 1 can set the power density to the optimal range by attaching the shaped carbon electrode 13, it is possible to satisfy conditions such as the arc discharge output, the amount of raw material powder to be melted, which is defined by the diameter (size) of the vitreous silica crucible, and a melting temperature and conditions such as a necessary arc discharge duration, necessary electrode strength, and prevention of generation of electrode vibration. As a result, the vitreous silica crucible manufacturing apparatus 1 can generate arc flame which may supply the amount of heat required for arc melting to the melting of the quartz powder molded body 11 and prevent the electrode vibration.

Figure 9:
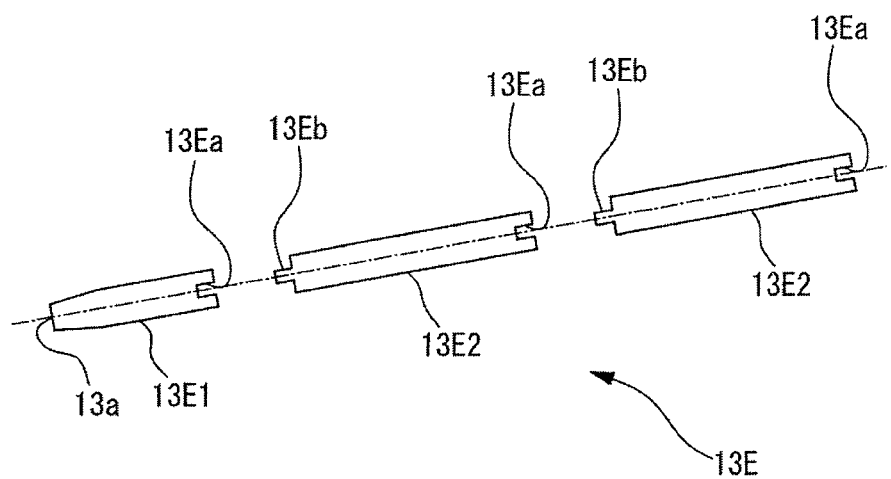
FIG. 9 is a schematic diagram showing a front end of a carbon electrode of a vitreous silica crucible manufacturing apparatus according to another embodiment of the present invention.

In addition, as the carbon electrode of the present invention, as shown in FIG. 9, a carbon electrode 13E may be used. The carbon electrode 13E is formed with a rod-like electrode 13E1 having a front end 13a for performing arc discharge and a plurality of electrodes 13E2 and 13E2 connected to the electrode 13E1. At this time, the front end 13a of the electrode 13E1 has a front end shape which is set as described above, and both the diameter of the base portion of the electrode 13E1 and the diameter of the outer shape of the electrode 13E2 are equally set to R1.

In the carbon electrode 13E, a female screw portion 13Ea is formed in one end (right end) of the electrode 13E1 which becomes the base end thereof, and a diameter reduction portion is formed in the other end (left end) thereof. Similarly, the female screw portion 13Ea and the male screw portion 13Eb are formed in both ends of the electrode 13E2, respectively, and the electrode 13E1 and the electrode 13E2 are formed to be extended by connecting the female screw portion 13Ea and the male screw portion 13Eb.

In this embodiment of the invention, the front end of the electrode 13E1 may be ground.

In addition, in the above-described guide sections 25, the concave portion corresponding to the attachment section 25B1 may be formed in the guide portion of the front end blade-guide section 25A and the concave portion corresponding to the attachment section 25A1 may be formed in the base portion 25a of the lateral periphery blade-guide section 25B. Therefore, the four guide sections 25 can be replaced with the substantially same shape and the manufacturing cost thereof can be reduced.

At this time, a dummy blade having the substantially same shape as the lateral surface grinding blade 22 may be attached to the concave portion formed in the guide portion 25b of the front end blade-guide section 25A in correspondence with the attachment section 25B1, and a dummy blade having the substantially same shape as the front end grinding blade 21 may be attached to the concave portion formed in the base portion 25a of the lateral periphery blade-guide section 25B in correspondence with the attachment section 25A1. Accordingly, when the carbon electrode 13 comes in contact with the guide sections 25 during the grinding, it is possible to prevent chipping of the carbon electrode 13 or damage of the guide sections 25.

In addition, although the diameter R3 of the base end side of the diameter reduction portion 13c is equal to the uniform diameter R1 and the diameter reduction portion 13c has the truncated conical shape in this embodiment of the invention, the following configurations are possible.

Figure 10:
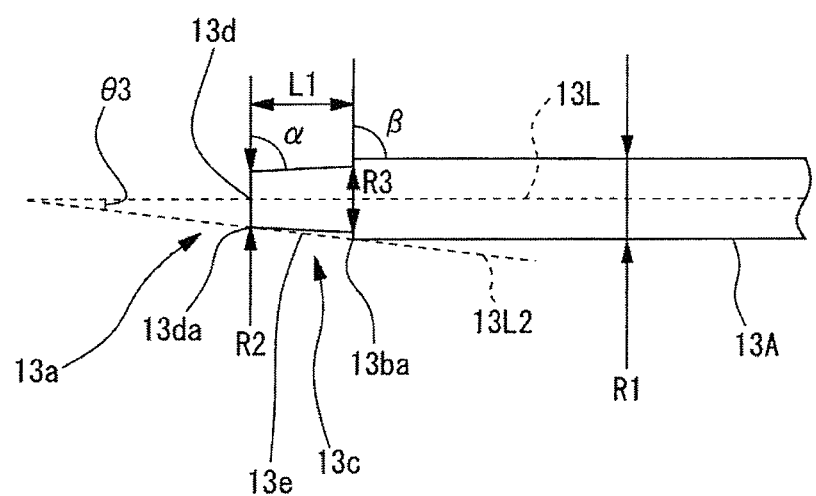
FIG. 10 is a schematic diagram showing a front end of a carbon electrode of a vitreous silica crucible manufacturing apparatus according to another embodiment of the present invention.

FIG. 10 is a schematic diagram showing a front end of a carbon electrode ground by the carbon electrode grinding apparatus according to another embodiment of the invention.

As shown in FIG. 10, a carbon electrode 13A has a diameter of R3<R1 and a diameter reduction portion 13c has a truncated conical shape. That is, a uniform diameter portion of a base end 13b and the diameter reduction portion 13c may form a step. In this case, an angle α and an angle β may be set to satisfy the above-described condition. In addition, an angle θ3 between a surface 13L2 and an electrode axis line 13L may be set to be equal to α or θ2, the surface 13L2 connecting an outer periphery 13da of a flat surface 13d to an outer periphery 13ba of end of the uniform diameter portion which forms the step.

The carbon electrode grinding apparatus can set a protrusion amount of the front end grinding blade 21 from the base portion 25a and a protrusion amount of the lateral surface grinding blade 22 from the guide portion 25b in correspondence with the shape.

Figure 11A:
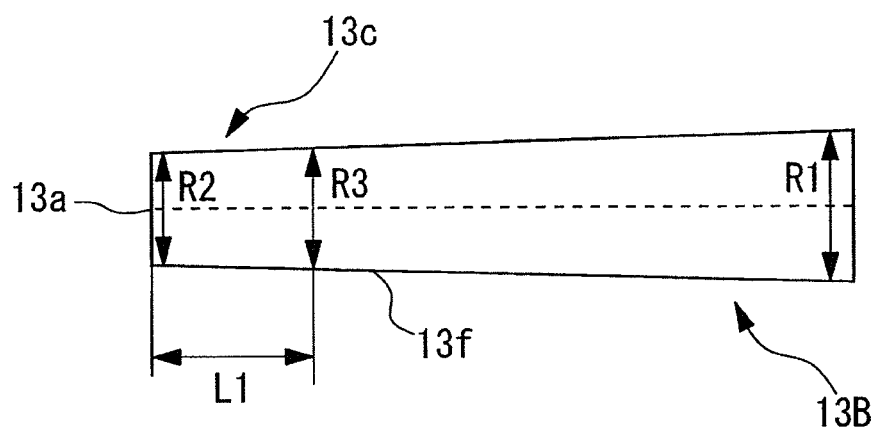
Figure 11B:
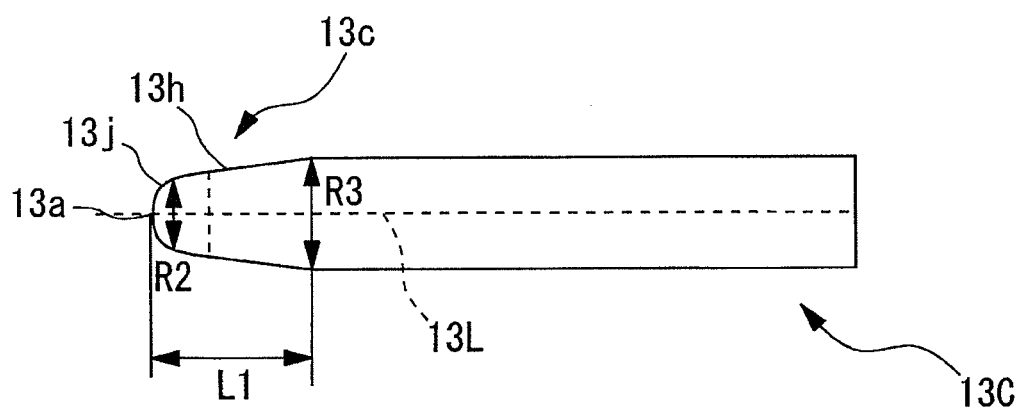

FIGS. 11A and 11B are schematic diagrams showing a front end of a carbon electrode of an arc discharge apparatus according to another embodiment of the present invention.

In the carbon electrode of the present invention, as shown in FIG. 11A, a diameter is gradually reduced from a base portion to a front end 13a of a carbon electrode 13B, the diameter R2 of the front end 13a is set to be less than the diameter R1 of the base portion, and a lateral surface 13f has a truncated conical shape over the entire length. In addition, by rounding the front end 13a with respect to that shown in FIGS. 5 and 6, as shown in FIG. 11B, a base portion of a contact portion in the front end 13a of the carbon electrode 13C becomes a lateral periphery surface 13h of the truncated cone continuous to the uniform diameter portion, the front end 13a from the truncated cone is smoothly continuous to the truncated cone, a curve in which a curvature discontinuous pint is not present in a cross-sectional contour along the axis line 13L of the carbon electrode 13, for example, an elliptical arc or a circular arc can be obtained. Out of these shapes, the shape not definitely having the outer periphery of the flat surface 13d may be set such that the distance between electrodes is nearest to one place such as the outer periphery 13da of the flat surface 13d shown in FIGS. 5 and 6.

The carbon electrode grinding apparatus can set a protrusion amount of the front end grinding blade 21 from the base portion 25a and a protrusion amount of the lateral surface grinding blade 22 from the guide portion 25b in correspondence with the shape.

EXAMPLES

Hereinafter, examples of the present invention will be described.

Example 1

An electrode was machined by the carbon electrode grinding apparatus of the present invention under the following conditions.

R1=50 mm, R2=35 mm, L1=100 mm

Motor capacity, the number of blades, the number of poles of the motor, torque, and a machining time at that time are shown in Table 1.

TABLE 1

|  | *Exp. Example 1 | Exp. Example 2 | Exp. Example 3 |
| --- | --- | --- | --- |
| Motor capacity (kW) | 0.2 | 0.4 | 0.4 |
| Number of blades | 4 | 4 | 2 |
| Number of poles | 4 | 4 | 6 |
| Torque (N · m) | 1.36 | 2.7 | 4.15 |
| Machining time (sec) | Not ground | Not ground | 5 |
| result | x | x | o |

TABLE 1-continued

|  | *Exp. Example 1 | Exp. Example 2 | Exp. Example 3 |
| --- | --- | --- | --- |

*Exp. = Experimental

From the result of Table 1, it can be seen that the electrode is inserted and thus cannot be machined since the motor capacity is small, in Experimental Examples 1 and 2. That is, in order to realize a more suitable electrode shape in the manufacture of the vitreous silica crucible shown in Example 2 and subsequent examples, the carbon electrode grinding apparatus of the present invention is necessary.

Example 2

Using the vitreous silica crucible manufacturing apparatus of the present invention, arc discharge was performed under different conditions of R2 shown in Table 2 so as to manufacture the vitreous silica crucible, and generation of vibration and attachment of fume to the electrode were visually determined and compared. The result is shown in Table 2. Here, in the judgment, a stable degree of arc which is most desirable for manufacture of the vitreous silica crucible was denoted by "⊙" (double circle), a desirable degree was denoted by "o" (single circle), and an undesirable degree was denoted by "x".

Crucible diameter: 32 inches
Output: 3,000 kVA
Treatment time: 30 minutes
Electrode shape: front end truncated cone
$\theta 1/2$: 10°
$\theta 2$: 4°
Carbon electrode diameter R1: 50 mm
Power density P of carbon electrode: 153 to 611 kVA/cm²

TABLE 2

|  | *Exp. Example 1 | Exp. Example 2 | Exp. Example 3 | Exp. Example 4 | Exp. Example 5 | Exp. Example 6 | Exp. Example 7 |
| --- | --- | --- | --- | --- | --- | --- | --- |
| $\theta 1/2$ [°] |  |  |  | 10 |  |  |  |
| L1 [mm] |  |  |  | 120 |  |  |  |
| R1 [mm] |  |  |  | 50 |  |  |  |
| R2 [mm] | 40 | 35 | 30 | 43 | 50 | 28 | 25 |
| R2/R1 | 0.80 | 0.70 | 0.60 | 0.86 | 1.00 | 0.56 | 0.50 |
| P/R2 [kVA/cm²] | 239 | 312 | 425 | 207 | 153 | 487 | 611 |
| Vibration | Absence | Absence | Absence | Absence | Absence | Presence | Presence |
| Attachment of fume | Absence | Absence | Absence | Presence | Presence | Absence | Absence |
| Judgment | ○ | ○ | ○ | X | X | X | X |

*Exp. = Experimental

From the above result, can be seen that, in R2/R1<0.6, vibration is generated when arc discharge is started, and thus arc is unstable. In addition, it can be seen that R2/R1>0.8 is not suitable because arc discharge becomes stable but silica fume is easily attached.

Example 3

Arc discharge was performed under the same condition as Example 2 except that R2 is set to a predetermined value of 30 mm and L1 is changed so as to manufacture the vitreous silica crucible, and generation of vibration and attachment of fume to the electrode were visually determined and compared. The result is shown in Table 3.

TABLE 3

|  | *Exp. Example 8 | Exp. Example 9 | Exp. Example 10 | Exp. Example 11 | Exp. Example 12 | Exp. Example 13 | Exp. Example 14 |
|---|---|---|---|---|---|---|---|
| θ1/2 [°] |  |  |  | 10 |  |  |  |
| R1 = R3 [mm] |  |  |  | 50 |  |  |  |
| R2 [mm] |  |  |  | 30 |  |  |  |
| L1 [mm] | 200 | 150 | 120 | 105 | 55 | 30 | 100 |
| L1 − x/tan(θ1/2) [mm] | 145 | 95 | 65 | 50 | 0 | −25 | +45 |
| Vibration | Absence | Absence | Absence | Slightly presence | Presence | Presence | Presence |
| Attachment of fume | Absence | Absence | Absence | Absence | Absence | Absence | Absence |
| Judgment | ◎ | ◎ | ◎ | ○ | X | X | X |

*Exp. = Experimental

From the above result, it can be seen that stable arc can be obtained if $L1-X/\tan(\theta 1/2)$ is 50 mm or more. When $L1-X/\tan(\theta 1/2)$ is too large, an undesirable result is obtained in view of cost for manufacturing the electrode. Thus, $L1-X/\tan(\theta 1/2)<150$ mm is preferable.

Example 4

Arc discharge was performed under the same condition as Example 2 except that R2 is set to a predetermined value of 30 mm and R3 is changed so as to manufacture the vitreous silica crucible, and generation of vibration and attachment of fume to the electrode were visually determined and compared. The result is shown in Table 4.

TABLE 4

|  | *Exp. Example 15 | *Exp. Example 16 | *Exp. Example 17 | *Exp. Example 18 | *Exp. Example 19 | *Exp. Example 20 |
|---|---|---|---|---|---|---|
| θ1/2 [°] |  |  | 10 |  |  |  |
| L1 [mm] |  |  | 120 |  |  |  |
| R1 [mm] |  |  | 50 |  |  |  |
| R2 [mm] |  |  | 30 |  |  |  |
| R3 [mm] | 50 | 45 | 43 | 40 | 38 | 35 |
| R3/R1 [—] | 1.00 | 0.90 | 0.86 | 0.80 | 0.76 | 0.70 |
| Vibration | Weak | Absence | Absence | Slightly presence | Presence | Presence |
| Attachment of fume | Absence | Absence | Absence | Absence | Absence | Absence |
| Judgment | ◎ | ◎ | ◎ | ○ | X | X |

*Exp. = Experimental

From the above result, it can be seen that, in R3/R1<0.8, arc becomes unstable because vibration is generated.

Example 5

Arc discharge was performed with a front end angle) ($\theta 2=4°$) of an electrode under the same condition as Example 2 except that R2 is set to a predetermined value of 30 mm and $\theta 1/2$ is changed so as to manufacture the vitreous silica crucible, and generation of vibration and attachment of fume to the electrode were visually determined and compared. The result is shown in Table 5.

TABLE 5

| | *Exp. Example 21 | *Exp. Example 22 | *Exp. Example 23 | *Exp. Example 24 | *Exp. Example 25 | *Exp. Example 26 |
|---|---|---|---|---|---|---|
| L1 [mm] | | | 120 | | | |
| R1 [mm] | | | 50 | | | |
| R2 [mm] | | | 30 | | | |
| θ1/2 [°] | 5 | 10 | 15 | 20 | 4 | 25 |
| Vibration | Weak | Absence | Absence | Absence | Presence | Absence |
| Attachment of fume | Absence | Absence | Absence | Slightly presence | Absence | Presence |
| Judgment | ○ | ◎ | ◎ | ○ | X | X |

*Exp. = Experimental

From the above result, it can be seen that, if θ1/2 is 5° or less, arc is generated from the portion other than the front end of the electrode, vibration is generated and thus an undesirable result is obtained. It can be seen that, if θ1/2 exceeds 20°, fume is easily attached to the electrode and thus an undesirable result is obtained.

Under a condition of R2=R1, a problem may occur because arc is generated at various places. Under a condition of R2<0.6R1, the electrode is excessively thin such that vibration is generated and thus an undesirable result is obtained. Originally, it is important that a range of 0.7R1 or less is set to 50 to 100 mm.

What is claimed is:

1. A carbon electrode grinding apparatus for shaping a front end of an arc discharge carbon electrode, comprising:
    front end grinding blades configured to grind a front end surface of the carbon electrode;
    lateral surface grinding blades configured to grind a lateral periphery surface from the front end surface to a base end of the carbon electrode; and
    a rotator configured to rotate and drive the front end grinding blades and the lateral surface grinding blades around a rotation axis line coincident with an axis line of the carbon electrode, wherein the rotator has four guide sections at positions divided in quarters with respect to the rotation axis line, the guide sections include two front end blade-guide sections to which the front end grinding blades are attached and two lateral periphery blade-guide sections to which the lateral surface grinding blades are attached, a first attachment section is formed in the front end blade-guide section to attach each of the front end grinding blades, and a second attachment section is formed in the lateral periphery blade-guide section to attach each of the lateral surface grinding blades.

2. The carbon electrode grinding apparatus as claimed in claim 1, wherein the front end grinding blades and the lateral surface grinding blades are attached to have a symmetrical position relationship using the rotation axis line as a symmetrical point.

3. The carbon electrode grinding apparatus as claimed in claim 1, wherein the lateral surface grinding blades are provided so as to extend in a direction along the rotation axis line, and are provided to become more distant from the rotation axis line from one end of the lateral surface grinding blades located at the front end grinding blade side toward the other end thereof.

4. The carbon electrode grinding apparatus as claimed in claim 1, wherein the front end grinding blades are provided so as to extend in a direction perpendicular to the rotation axis line.

5. The carbon electrode grinding apparatus as claimed in claim 1, wherein the front end grinding blades are attached to two sections of the guide sections which are not adjacent to each other around the rotation axis line, and the lateral surface grinding blades are attached to the other two sections of the guide sections which are not adjacent to each other around the rotation axis line.

6. The carbon electrode grinding apparatus as claimed in claim 5, wherein the front end blade-guide sections to which the front end grinding blades are attached and the lateral periphery blade-guide sections to which the lateral surface grinding blades are attached are arranged so as to be adjacent to each other around the rotation axis line.

7. The carbon electrode grinding apparatus as claimed in claim 1, wherein a dummy blade is formed in at least one of the guide sections, to which the front end grinding blades and the lateral surface grinding blades are not attached.

8. The carbon electrode grinding apparatus as claimed in claim 1, wherein the two front end grinding blades are attached to two of the guide sections which are not adjacent to each other, and the two lateral surface grinding blades are attached to the other two of the guide sections which are not adjacent to each other.

9. The carbon electrode grinding apparatus as claimed in claim 1, wherein the front end blade-guide sections to which the front end grinding blades are attached do not perform grinding by the lateral surface grinding blades, and the lateral periphery blade-guide sections to which the lateral surface grinding blades are attached do not perform grinding by the front end grinding blades.

* * * * *